United States Patent
Bhattacharjee et al.

(10) Patent No.: US 10,863,428 B2
(45) Date of Patent: Dec. 8, 2020

(54) APPARATUS, SYSTEM AND METHOD FOR OPTIMIZED TUNE AWAY PROCEDURES

(71) Applicant: APPLE INC., Cupertino, CA (US)

(72) Inventors: Deepankar Bhattacharjee, Milpitas, CA (US); Sreevalsan Vallath, Dublin, CA (US); Prateek Sharma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 572 days.

(21) Appl. No.: 14/869,325

(22) Filed: Sep. 29, 2015

(65) Prior Publication Data

US 2016/0345351 A1 Nov. 24, 2016

Related U.S. Application Data

(60) Provisional application No. 62/165,602, filed on May 22, 2015.

(51) Int. Cl.
*H04W 36/14* (2009.01)
*H04W 48/18* (2009.01)
*H04W 56/00* (2009.01)
H04W 74/08 (2009.01)
H04W 88/06 (2009.01)
H04W 76/16 (2018.01)

(52) U.S. Cl.
CPC ....... *H04W 48/18* (2013.01); *H04W 56/0015* (2013.01); *H04W 74/0833* (2013.01); *H04W 76/16* (2018.02); *H04W 88/06* (2013.01)

(58) Field of Classification Search
None
See application file for complete search history.

(56) References Cited

U.S. PATENT DOCUMENTS

| | | | | |
|---|---|---|---|---|
| 9,319,952 B2 * | 4/2016 | Zhao | ............... | H04W 36/14 |
| 9,913,187 B1 * | 3/2018 | Pawar | ............... | H04W 36/0022 |
| 2008/0075036 A1 * | 3/2008 | Bertrand | ............... | H04W 74/04 |
| | | | | 370/328 |
| 2012/0294173 A1 * | 11/2012 | Su | ............... | H04W 24/10 |
| | | | | 370/252 |
| 2013/0315119 A1 * | 11/2013 | Tabet | ............... | H04W 52/0216 |
| | | | | 370/311 |
| 2014/0307623 A1 * | 10/2014 | Gheorghiu | ............... | H04W 76/026 |
| | | | | 370/328 |
| 2016/0037578 A1 * | 2/2016 | Shah | ............... | H04W 76/048 |
| | | | | 370/311 |
| 2016/0088681 A1 * | 3/2016 | Chang | ............... | H04W 76/048 |
| | | | | 455/405 |
| 2016/0165642 A1 * | 6/2016 | Lunden | ............... | H04W 72/04 |
| | | | | 455/450 |
| 2016/0174187 A1 * | 6/2016 | Gopala Krishnan | . | H04W 68/02 |
| | | | | 455/458 |
| 2017/0215172 A1 * | 7/2017 | Yang | ............... | H04W 72/042 |

* cited by examiner

*Primary Examiner* — Brandon M Renner
(74) *Attorney, Agent, or Firm* — Fay Kaplun & Marcin, LLP

(57) ABSTRACT

A user equipment and a method performed by the user equipment that has a transceiver configured to enable the user equipment to establish a connection with a first network and a second network. The method including establishing a connection to each of the first network and the second network, tuning away from the first network to the second network, tuning back to the first network from the second network and determining whether to perform a network operation with the first network after tuning back to the first network.

18 Claims, 4 Drawing Sheets

APPARATUS, SYSTEM AND METHOD FOR OPTIMIZED TUNE AWAY PROCEDURES

PRIORITY INFORMATION/INCORPORATION BY REFERENCE

This application claims priority to U.S. Provisional Application 62/165,602 entitled "Apparatus, System and Method for Optimized Tune Away Procedures," filed on May 22, 2015, the entirety of which is incorporated herein by reference.

BACKGROUND INFORMATION

A user equipment (UE) may be configured to establish a connection with a network. For example, the UE may be mobile device and utilize a wireless communications protocol. Based upon the capabilities of the hardware and software of the UE, the connection may be made with different types of networks. In a first example, the network may be a Long Term Evolution (LTE) network. In a second example, the network may be a Code Division Multiple Access (CDMA) network.

The UE may connect to the LTE network for data connectivity and to the CDMA network for voice connectivity. The UE may be a Single Radio LTE (SR-LTE) equipped device. In such a scenario, the UE may establish a connection with the LTE network only to tune away (at least temporarily) to the CDMA network to determine if a voice call is destined for the UE on the CDMA network. Subsequently, the UE may tune back to the LTE network. In a typical scenario, the UE tunes away to the CDMA network based on the CDMA network's paging cycle (e.g., every 5.12 seconds). The typical duration for the tune away is 80-200 milliseconds (ms).

When the UE tunes back to the LTE network, the UE sends a scheduling request to the evolved Node B (eNB) of the LTE network to determine that the uplink (UL) connection is in-sync. If the UE is out of sync, as may be indicated by a UL-OUT_OF_SYNC event, the UE will trigger a Random Access Channel (RACH) procedure to attempt to re-synchronize with the LTE network. The initiation of the RACH procedure causes the UE to use additional battery and transmission resources and also causes the network (e.g., the eNB) to use additional computing and transmission resources.

SUMMARY

In one exemplary embodiment, a method is performed by a user equipment having a transceiver configured to enable the user equipment to establish a connection with a first network and a second network. The method includes establishing a connection to each of the first network and the second network, tuning away from the first network to the second network, tuning back to the first network from the second network and determining whether to perform a network operation with the first network after tuning back to the first network.

In another exemplary embodiment, a user equipment has a transceiver configured to enable the user equipment to establish a connection with a first network and a second network and a processor configured to instruct the transceiver to establish a connection to each of the first network and the second network, instruct the transceiver to tune away from the first network to the second network, instruct the transceiver to tune back to the first network from the second network and determine whether to perform a network operation with the first network after tuning back to the first network.

In a further exemplary embodiment, a nonvolatile computer-readable medium comprises a set of instructions that, when executed, cause a processor to perform operations. The operations include establishing a connection by a user equipment to each of a first network and a second network, tuning away the user equipment from the first network to the second network, tuning back the user equipment to the first network from the second network and determining whether to perform a network operation with the first network after tuning back to the first network, wherein the network operation includes one of transmitting a scheduling request to the first network or initiating a random access channel (RACH) procedure with the first network.

DETAILED DESCRIPTION

Figure 1:
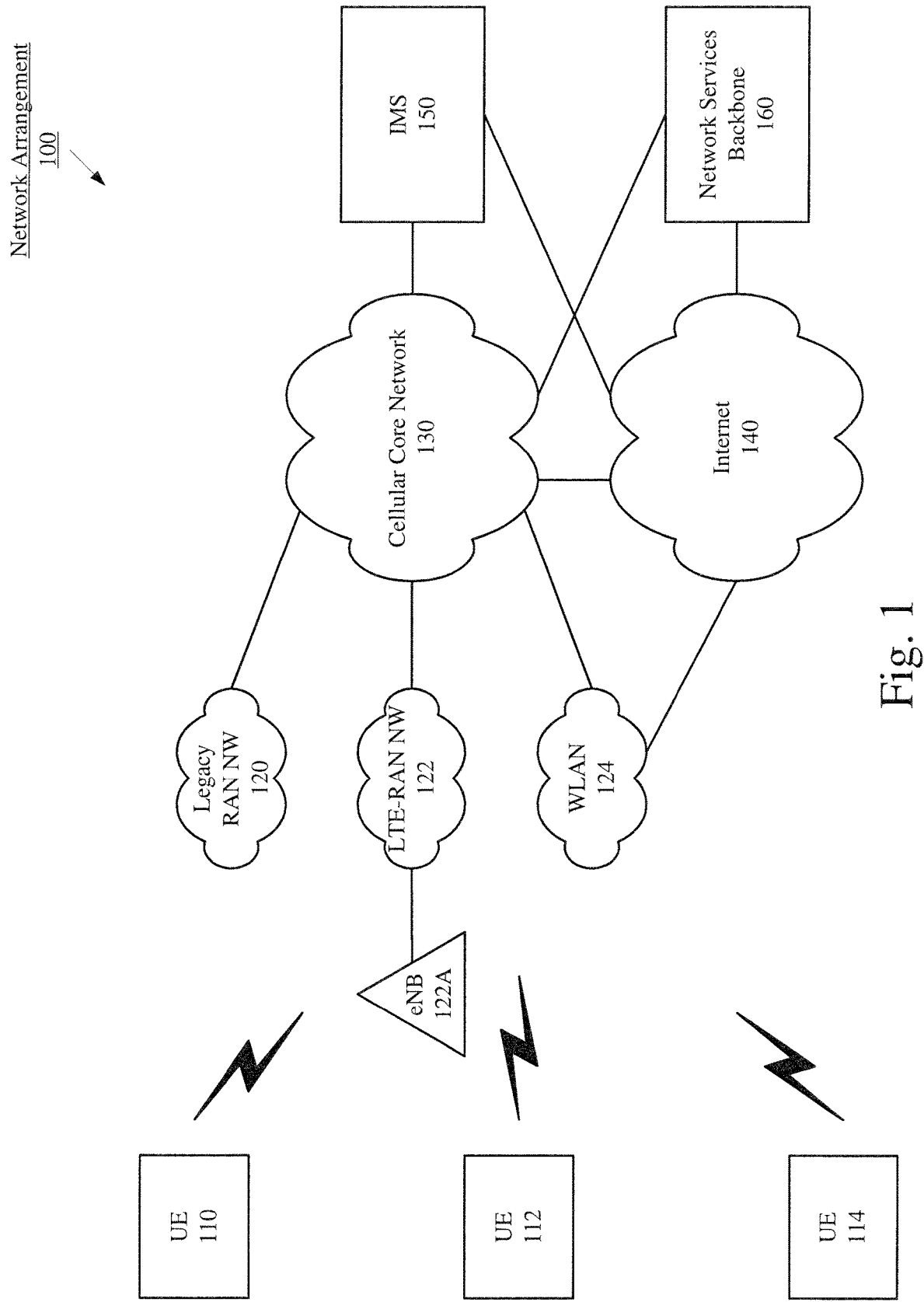
FIG. 1 shows an exemplary network arrangement, according to various embodiments.

The exemplary embodiments may be further understood with reference to the following description and the related appended drawings, wherein like elements are provided with the same reference numerals. The exemplary embodiments are related to an apparatus, system and method for optimizing tune away procedures of a user equipment (UE) that connects to multiple networks. The UE may be configured to establish a connection with different types of networks such as an LTE network, a CDMA network, a Global System for Mobile Communications (GSM) network, etc. The UE may perform tune-away and tune-back procedures in view of this capability. The exemplary embodiments provide a mechanism to keep the UE in an out of sync state on tune back, under certain circumstances, to save power and resources at the UE and resources at the network.

FIG. 1 shows an exemplary network arrangement 100, according to various embodiments. The exemplary network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may communicate are a legacy radio access network (RAN) 120, a LTE RAN (LTE-RAN) 122, and a wireless local area network (WLAN) 124. More specifically, the legacy RAN 120 may be a CDMA network. In this example, each of the networks 120-124 is a wireless network with which the UEs 110-114 may communicate wirelessly. However, it should be understood that the UEs 110-114 may also communicate with other types of networks and may also communicate using a wired connection. With regards to the exemplary embodiments, the UEs 110-114 may establish a connection with the LTE-RAN 122 to, among other functionalities, perform data transfers with the LTE network. In another example, the UEs 110-114 may communicate with the legacy RAN 120 that is a CDMA network. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 particularly using the CDMA configuration may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. This subscription information is used to provide the correct multimedia services to the user. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party. Thus, the network arrangement 100 allows the UEs 110-114 to perform functionalities generally associated with computers and cellular networks.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 connecting to the legacy RAN 120 and the LTE-RAN 122, the connection to the LTE-RAN 122 being via an eNB 122A. Initially, the UEs 110-114 may establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific access point (e.g., the eNB 122A of the LTE-RAN 122). Thus, the UEs 110-114 that are associated with the eNB 122A may utilize the connected state discontinuous reception ("CDRX") functionality when configured to perform this feature. Subsequently, while associated with the eNB 122A and connected to the LTE-RAN 122, the UE may tune away to the legacy RAN 120 for a temporary amount of time. During this tune away time, the UE may check for activity in the legacy RAN 120. In a specific embodiment where the UE is receiving data connectivity from the LTE-RAN 122 and voice connectivity from the legacy RAN 120, the activity may be pages from the legacy RAN 120. The UE may then tune back to the LTE-RAN 122.

From the UE perspective, the connection with the LTE-RAN 122 remains the same. That is, the temporary tuning away from the LTE-RAN 122 to the legacy RAN 120 does not have any impact on the connection. More specifically, upon the UE tuning back to the LTE-RAN 122, the UE expects a substantially similar connection with the LTE-RAN 122 as if the tune-away procedure was not even performed. With the knowledge of the tune-away procedure being performed, the UE therefore expects no change in service when tuning back to the LTE-RAN 122.

When the UE tunes away to the legacy RAN 120 and then tunes back to the LTE-RAN 122, the UE may send a scheduling request to the eNB 122A to determine if the uplink (UL) of the UE remains in-sync with the eNB 122A. Synchronization of the UE with the eNB 122A may be considered a time alignment between the UE and eNB 122A that is a result of the RACH procedure. The determination made by the UE after the tune back is to determine if the time alignment from the last RACH procedure through the last downlink (DL) or UL transmissions is ongoing and remains valid. In one exemplary scenario, the UE may lose synchronization because the UE has not exchanged data with LTE-RAN 122 for a long period of time (e.g., the time of the tune away). In the exemplary embodiments, the LTE-RAN 122 may provide the UE with a time alignment timer (TAT) via, for example, the RRCReconfiguration message. The LTE-RAN 122 is configured to send timing advance commands (TA) with the duration of TAT, such that UE may assume it is in sync with LTE-RAN 122. On expiry of the TAT (e.g., no receipt of a timing advance command), the UE may consider that it is in the out of sync state (e.g., UL_OUT_OF_SYNC) with the LTE_RAN 122. In current implementations, when the UE detects it is out of sync, the UE will initiate a RACH procedure with the eNB 122A to come back into synchronization.

However, according to the exemplary embodiments, there may be circumstances where it is more efficient for the UE to remain out of sync with the eNB 122A. Exemplary circumstances for allowing the UE to remain out of sync will be described in greater detail below. Examples of the potential efficiencies gained by allowing the UE to remain out of sync may include power and resource savings associated with not sending the scheduling request, not performing the RACH procedure, releasing its UL Physical Uplink Control Channels (PUCCH) and not sending other signals (e.g., Channel Quality Indicators (CQI), Rank Indication (RI), Precoding Matrix Indicator (PMI), etc.) to the LTE-RAN 122. In addition, there may also be resource savings realized on the network side (e.g., at eNB 122A) because the eNB 122A may stop transmitting timing advance (TA) commands to the UE, which may also allow the eNB 122A to increase the cell capacity. Thus, the exemplary embodiments provide apparatus, systems and methods for controlling the frequency of scheduling requests (SR) and RACH triggers after the UE tunes back to the LTE-RAN 122.

Figure 2:
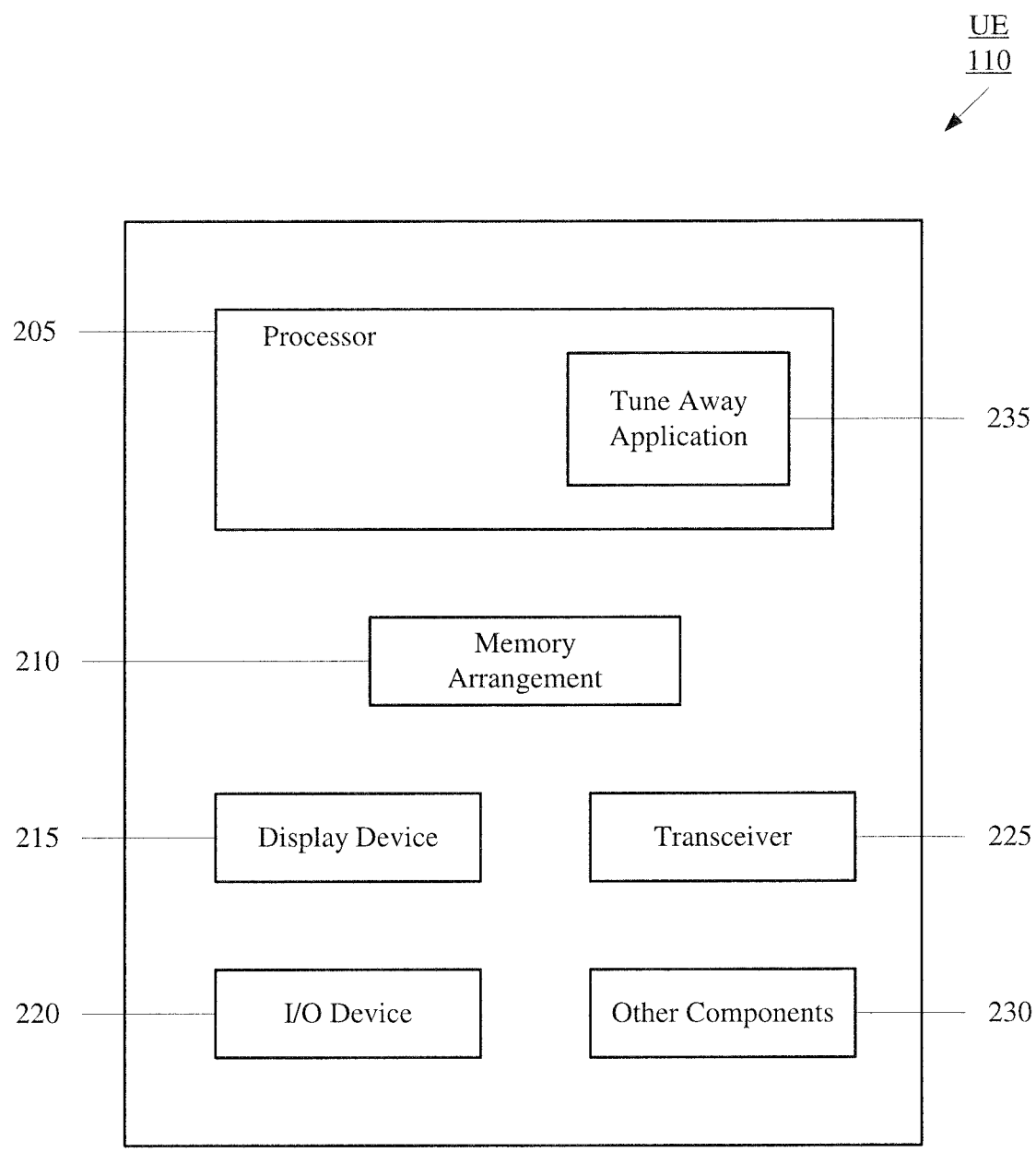
FIG. 2 shows an exemplary user equipment (UE) configured to control whether to initiate a scheduling request or RACH procedure by the UE, according to various embodiments.

FIG. 2 shows the UE 110 of the network arrangement 100 of FIG. 1 that is configured to control the frequency of SRs and RACH triggers after the UE 110 tunes back to the LTE-RAN 122, according to various embodiments. Specifically, the UE 110 includes functionality that controls when a SR and/or RACH procedure is initiated after the UE 110 tunes back to the LTE-RAN 122 after tuning away to the legacy RAN 120. For exemplary purposes, the UE 110 may also represent the UEs 112, 114. However, it should be noted that the other UEs 112, 114 may not necessarily be capable of performing the functionalities described below with regard to the UE 110.

The UE 110 may represent any electronic device that is configured to perform wireless functionalities and may be representative of one or more of the UEs 110-114. For example, the UE 110 may be a portable device such as a smartphone, a tablet, a phablet, a laptop, a wearable, etc. In another example, the UE 110 may be a client stationary device such as a desktop terminal. The UE 110 may be configured to perform cellular and/or WiFi functionalities. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a web browser when connected to a communication network via the transceiver 225. The use of the web browser may entail requesting uplink grants to transmit requests to the web browser or downlink grants to receive data from a website. Those skilled in the art will understand that these grants may be LTE data traffic performed while the UE 110 is connected to the LTE-RAN 122 via the eNB 122A. In yet another example, the processor 205 may execute a tune away application 235 to control when a SR and/or RACH procedure is initiated after the UE 110 tunes back to the LTE-RAN 122 after tuning away to the legacy RAN 120.

It should be noted that the above noted applications being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. In addition, in some UEs, the functionality described for the processor 205 is split among two processors, a baseband processor and an applications processor. The exemplary embodiments may be implemented in any of these or other configurations of the UE.

The memory 210 may be a hardware component configured to store data related to operations performed by the UE 110. Specifically, the memory 210 may store data related to the tune away function that may be used by the tune away application 235 to perform the functionalities described herein. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and receive data with the eNB 122A. The transceiver 225 may enable communication with the LTE-RAN 122 or with other electronic devices directly or indirectly through the LTE-RAN 122 to which the UE 110 is connected. The transceiver 225 may operate on a variety of different frequencies or channels (e.g., set of consecutive frequencies). For example, the transceiver 225 may connect to the legacy RAN 120 using corresponding frequencies and also connect to the LTE-RAN 122 using corresponding frequencies. Thus, an antenna or multiple antennae (not shown) coupled with the transceiver 225 may enable the transceiver 225 to operate on these frequency bands.

As discussed above, the exemplary embodiments utilize the tune away application 235 to control when a SR and/or RACH procedure is initiated after the UE 110 tunes back to the LTE-RAN 122. In a first exemplary mechanism, the tune away application 235 may control whether to initiate a SR or RACH procedure based on a quantity of data that is in the MAC UL buffer. For example, if there is no data or very little data in the MAC UL buffer, the tune away application 235 may determine that no SR or RACH procedure should be initiated. In a second exemplary mechanism, the tune away application 235 may control whether to initiate a SR or RACH procedure based on the duration of the tune away to the legacy RAN 120. For example, the longer the tune away, the more likely that a SR or RACH procedure should be initiated. In a third exemplary mechanism, the tune away application 235 may control whether to initiate a SR or RACH procedure based on the radio resource control (RRC) inactivity timer of the network. In this example, the UE 110 may learn about the operation of the RRC inactivity timer and base the decision whether to initiate a SR or RACH procedure on the operation of the RRC inactivity timer. Each of these exemplary mechanisms will be described in greater detail below.

Figure 3:
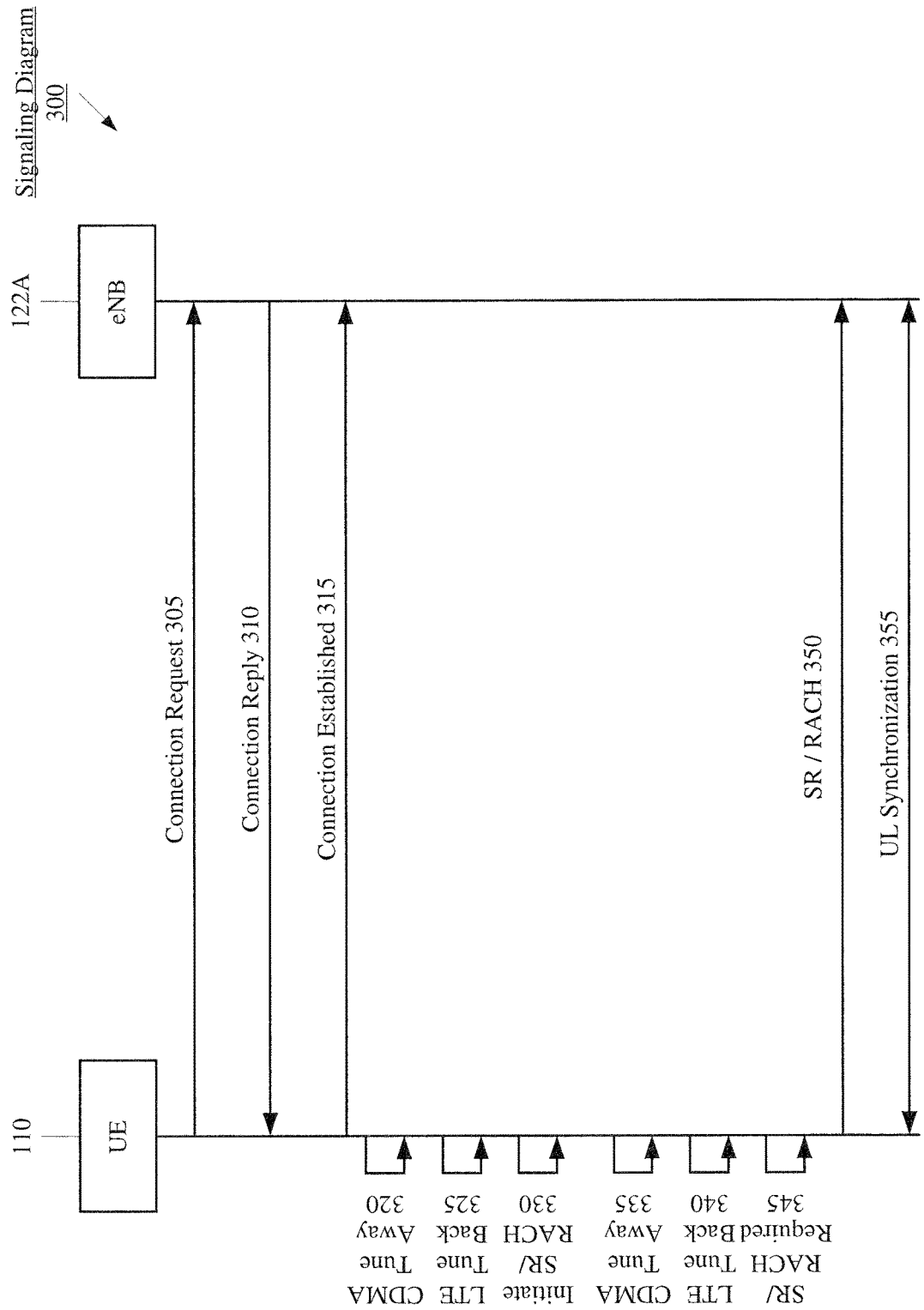
FIG. 3 shows an exemplary signaling diagram controlling whether to initiate a scheduling request or RACH procedure by the UE when tuning back to an LTE network, according to various embodiments.

FIG. 3 shows an exemplary signaling diagram 300 for controlling whether to initiate a SR or RACH procedure by the UE 110 when tuning back to the LTE-RAN 122, according to various embodiments. Thus, the signaling diagram 300 relates to when the UE 110 performs a tune-away procedure to tune away from the LTE-RAN 122 to the legacy RAN 120 and tune back from the legacy RAN 120 to the LTE-RAN 122.

The signaling diagram 300 illustrates a generic procedure to first connect to the LTE-RAN 122 by the UE 110. Specifically, the UE 110 transmits a connection request 305 when the UE 110 is within an operating area of the eNB 122A and detects the presence of the LTE-RAN 122. The eNB 122A may transmit a connection reply 310 to the UE 110. Subsequently, a connection 315 may be established between the LTE-RAN 122 and the UE 110. The initiation of the RACH procedure by the UE 110 may occur during the connection request 305 or the connection establishment 315. However, in any case, the synchronization between the UE 110 and the eNB 122A is established by the completion of the connection establishment 315.

While connected to the LTE-RAN 122, the UE 110 may perform a tune-away procedure 320 to the legacy RAN 120 such as a CDMA network to check for activity. The tune-away procedure may be performed in a variety of manners such as periodically, aperiodically, upon request, etc. In one exemplary embodiment, the frequency and timing of the tune away procedure is based on the paging schedule of the legacy RAN 120. When the UE 110 eventually tunes back 325 to the LTE-RAN 122, the UE 110 determines 330 whether the UE 110 should initiate a SR or RACH procedure. Examples of mechanisms for making the SR/RACH determination were provided above and will be described in greater detail below.

In the exemplary signaling diagram 300, it may be considered that the UE 110 determination 330 indicates that no SR/RACH initiation should be performed at the time of tune back. Thus, the UE 110 will not initiate a SR or RACH procedure and no corresponding signals (e.g., signals associated with SR or RACH) will be exchanged between the UE 110 and the eNB 122A. Those skilled in the art will understand that the determination 330 may have resulted in the opposite determination (e.g., SR and/or RACH should be initiated) and the appropriate steps for initiating the SR and/or RACH will be performed. An example of this signaling will be provided below. It should also be noted that the determination 330 may be performed one time at tune back 325 or be an ongoing process. For example if the determination is an ongoing process, the UE 110 may continuously perform the determination 330 after the tune back 325 and not wait until the next tune back. To provide a specific use case, if the mechanism used to perform the SR/RACH determination is the quantity of data in the MAC UL Buffer, the quantity may be below a threshold at the time of tune back 325, but may exceed the threshold before the onset of the next tune away 335. In such a situation, if the UE 110 is continuously performing the determination 330 when the UE 110 is connected to the LTE-RAN 122 after tune back 325, the UE 110 may determine that the SR or RACH procedure should be performed when the amount of data in the UL buffer reaches a threshold amount.

At a later time, the UE 110 will once again tune away 335 to the legacy RAN 120 and then tune back 340 to the LTE-RAN 122. After the tune back 340, the UE 110 will once again determine 345 whether the UE 110 should initiate a SR or RACH procedure. In this exemplary signaling diagram 300, it is considered that the UE 110 determines that an SR or and/or RACH procedure should be initiated. Thus, the UE 110 will initiate 350 either the SR or RACH procedure and UL synchronization 355 will be established between the UE 110 and the eNB 122A such that the UE 110 may send data over the UL channel to the eNB 122A.

Accordingly, the UE 110 does not automatically perform the SR (after tune back) or RACH procedure (when out of sync), but rather performs an analysis to determine if the SR and/or RACH procedure is needed after tune back. As described above, this selective use of SR and/or RACH may improve the performance of both the UE 110 and the eNB 122A.

Figure 4:
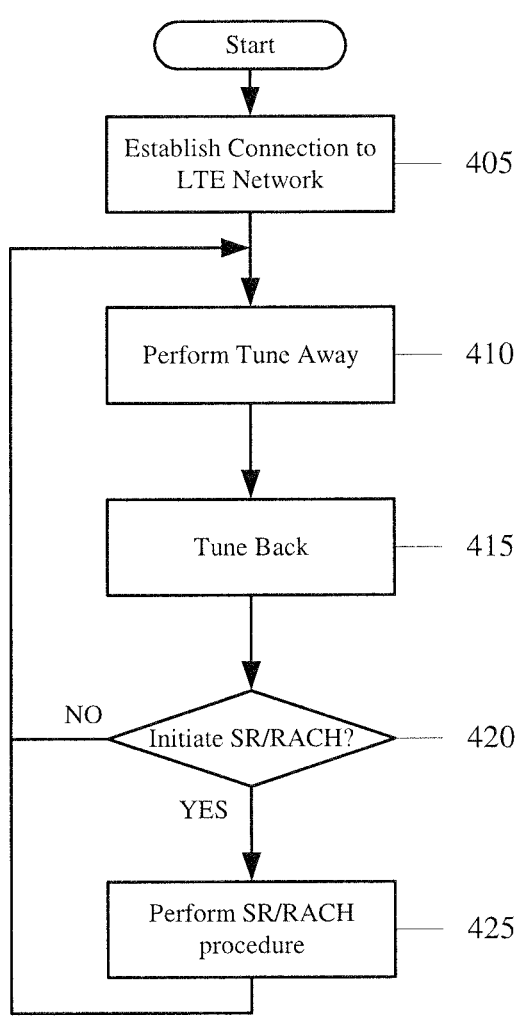
FIG. 4 shows an exemplary method for controlling whether to initiate a scheduling request or RACH procedure by the UE when tuning back to an LTE network, according to various embodiments.

FIG. 4 shows an exemplary method for controlling whether to initiate a scheduling request or RACH procedure by the UE when tuning back to an LTE network, according to various embodiments. The method 400 will be described with reference to the UE 110 performing the various functionalities. The method 400 will also be described with reference to the network arrangement 100 of FIG. 1, the UE 110 of FIG. 2, and the signaling diagram 300 of FIG. 3.

In 405, the UE 110 establishes a connection with the LTE-RAN 122 via the eNB 122A. As discussed above, any association process may be used. While the UE 110 is connected to the LTE-RAN 122, the UE 110, in 410, may perform a tune-away procedure 410. Because the UE 110 may be configured to establish a connection to different types of networks, the tune-away procedure may be performed such that the UE 110 tunes away from the LTE-RAN 122 to the legacy RAN 120 that may be a CDMA network. The tune-away procedure may enable the UE 110 to check for activity on the legacy RAN 120 prior to tuning back.

In 415, the UE 110 tunes back from the legacy RAN 120 to the LTE-RAN 122. When the UE 110 tunes back, the UE 110 determines, in 420, whether an SR or RACH procedure should be performed. As described above, there may be multiple manners or mechanisms for determining whether an SR or RACH procedure should be performed. In a first exemplary mechanism, the tune away application 235 may monitor the MAC UL Buffer to determine the amount of data in the buffer when the UE 110 resumes operation of the LTE stack. Those skilled in the art will understand that the MAC UL buffer holds the data that the UE 110 will send via the UL channel to the eNB 122A. The amount of data in the buffer may be a variable that is included in the internal statistics of the MAC UL buffer and the variable may be available for the tune away application 235. If there is no data in the MAC UL buffer, then the tune away application 235 may determine that there is no need to perform the SR and/or RACH procedure because the UE 110 has no data that needs to be communicated via the UL channel. Those skilled in the art will understand that the MAC UL buffer is only exemplary and that other buffers or storage mechanisms may be used to store or queue data that is to be transmitted on the UL channel by the UE 110. Any of these buffers or storage mechanisms may be used in the same manner as described for the MAC UL buffer.

However, the determination may not be limited to a Boolean determination of data or no data in the MAC UL buffer. There may also be a threshold value of data. This threshold value of data is an amount of data below which the tune away application 235 determines that there is no need to perform the SR and/or RACH procedure and above which the tune away application 235 determines that the SR and/or RACH procedure should be performed. The threshold amount of data may be set based on any number of factors. For example, the threshold may be set to a value where it is likely that critical information to keep the connection between the UE 110 and the eNB 122A active is in the MAC UL buffer and needs to be communicated via the UL channel. In another example, the threshold may be set based on performance parameters wherein it is determined that not sending the UL data results in a degraded user experience. The threshold may be set individually based on the carrier network, type of device, level of service for device, connection quality parameters, etc.

In a second exemplary mechanism, the determination by the tune away application 235 of whether to initiate a SR and/or RACH procedure may depend on the duration of the tune away (e.g., the time between tune away 320 and tune back 325). For example, if the duration of the tune away is below a threshold time (e.g., 80 ms), it may be assumed that the UE 110 may have remained in sync with the eNB 122A and there is no need to initiate an SR and/or RACH procedure. On the other hand, a delay of longer than the threshold may indicate that it is likely that the UE 110 is out of sync and therefore the SR and/or RACH procedure should be initiated. Those skilled in the art will understand that the threshold of 80 ms is only exemplary and that other duration thresholds may be set based on any number of factors.

In addition, it should be noted that the first and second mechanisms may both be used in the determination in 420. For example, the tune away application 235 may evaluate both mechanisms when making the determination in 420. If either condition is satisfied (e.g., the amount of information in the buffer is greater than the threshold or if the duration of the tune away is greater than the threshold), the tune away application may determine that the UE 110 should initiate the SR and/or RACH procedure. In another example, the thresholds of the first or second mechanisms may be variable based on the value of the other mechanism. For example, if there is no data in the buffer, the threshold for the duration may be longer. However, if there is data in the buffer that is below the buffer data threshold, the threshold for the duration may be set lower. Those skilled in the art will be able to determine other combinations of variables and values based on these examples.

In a third exemplary mechanism, the tune away application 235 may learn about the operation of the RRC inactivity timer. The RRC inactivity timer is a timer that is controlled by the network (e.g., LTE-RAN 122). In LTE networks, when the RRC inactivity timer times out (e.g., the eNB 122A has not received any communication from the UE 110 for the duration of the timer), the eNB 122A releases the RRC connection between the eNB 122A and the UE 110. However, the setting for RRC inactivity timers may vary across provider networks or even within the same provider network based on a variety of factors such as congestion, time of day, etc. Thus, the UE 110 may not have specific knowledge of when its connection will be released based on the RRC inactivity timer. The goal of the UE 110 is to not be released if the UE 110, in fact, has data that is to be sent to the eNB 122A. If the UE 110 does not perform the SR and/or RACH procedure, the RRC connection may be released because there was no UL communication between the UE 110 and the eNB 122A before the expiration of the RRC inactivity timer of the LTE-RAN 122. However, as will be described in greater detail below, the tune away application 235 may learn about the operation of the RRC inactivity timer (e.g., predict when the eNB 122A is likely to release the RRC connection) and consider this when making the determination in 420 whether to initiate the SR and/or RACH procedure.

In one exemplary embodiment, the tune away application 235 may determine the current release pattern for the UE 110. That is, the tune away application 235 may record when the eNB 122A has released the RRC connection with the UE 110 and the duration of the UL inactivity when the connection is released. Those skilled in the art will understand that not every RRC connection release is driven by the RRC inactivity timer, there may be other reasons for the connection release such as a radio link failure (RLF), the UE 110 moving to a different cell, etc. Thus, the tune away application 235 may factor these possibilities when estimating the duration of the RRC inactivity timer based on its previous experience with the eNB 122A. Moreover, the tune away application 235 may not be limited to only using its experience with the eNB 122A, but may also factor in its experience with neighboring cells or cells within a certain geographical area because it is likely that these cells have a similar RRC inactivity timer duration. In addition, the tune away application 235 may also factor in current operating conditions such as time of day, the strength of signals being received from the eNB 122A, etc.

In another exemplary embodiment, the tune away application 235 may have access to the RRC inactivity timer information that is collected by other UEs that have connected to the eNB 122A. For example, each UE that performs the analysis described above with respect to the first exemplary embodiment, may report this information to a central database so that other UEs have access to this information. The central database may be controlled by the network provider, by the provider of the device (e.g., provider of UE 110) or by any other entity to which the UEs send the information. The UE 110 (and tune away application 235) may access this database and search the database for RRC inactivity timer information for similarly situated UEs (e.g., geographic location, mobile country code (MCC), mobile network code (MNC), etc.). Based on this information, the tune away application 235 may estimate the duration of the RRC inactivity timer for the eNB 122A. It should be noted that the tune away application may use both the specific information collected by the UE 110 and the information included in the central database to estimate the duration of the RRC inactivity timer for the eNB 122A.

Once the tune away application 235 estimates the length of the RRC inactivity timer of the eNB 122A, the tune away application may start a corresponding timer on the UE 110 side. For example, after a last UL transmission, the tune away application 235 may start a UE RRC inactivity timer having a duration of the estimated duration of the eNB 122A RRC inactivity timer. The tune away application 235 may monitor the MAC level activity of the UE 110 (e.g., the UL transmissions) and reset the UE RRC inactivity timer based on the MAC level activity. If the tune away (e.g., tune away 320) occurs within a threshold (e.g., 200 ms) of the UE RRC inactivity timer expiring, then the tune away application may determine in 420 that the UE should perform a SR and/or RACH procedure upon tuning back to the LTE-RAN 122.

As described above, a general goal of the UE 110 is not to have the RRC connection released. If the network side RRC inactivity timer were to time out after the UE 110 tuned back to the LTE-RAN 122 because the UE 110 did not perform the SR and/or RACH procedure, this may generally be considered a degraded condition. Thus, by estimating when this RRC connection release may occur and performing the SR and/or RACH procedure after tune back, but prior to the release, the network side RRC inactivity timer may be reset and the RRC connection release may be prevented. The threshold having a value of 200 ms is only exemplary and may be set to any value based on any number of factors. In one exemplary embodiment, the threshold may be variable based on the level of confidence in the estimate of the duration of the network RRC inactivity timer.

It should be understood that similar to the first and second exemplary mechanisms described above, this third exemplary mechanism may also be used alone or in conjunction with the other described mechanisms. It should also be understood that the three described mechanisms for determining in 420 whether to initiate an SR or RACH procedure are only exemplary. Those skilled in the art will understand that other mechanisms may be used in accordance with the principles described herein.

Returning to the method 400, if it is determined in 420 that the UE 110 should not initiate the SR or RACH procedure, the method 400 returns to 410 where, after a predetermined period of time, the UE 110 will tune away from the LTE-RAN 122 to the legacy RAN 120. The method 400 will then proceed in the same manner as described above. As noted previously, the determination in 420 may occur a single time or multiple times after any individual tune back and before the next tune way.

If it is determined in 420 that the UE 110 should initiate the SR or RACH procedure, the method proceeds to 425 where the UE 110 performs the SR to determine if the UE 110 is synchronized with the eNB 122A and the RACH procedure to synchronize with the eNB 122A if it is not currently synchronized. After the completion of the SR and/or RACH procedure in 425, the method 400 returns to 410 where, after a predetermined period of time, the UE 110 will tune away from the LTE-RAN 122 to the legacy RAN 120.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
    at a user equipment having a transceiver configured to enable the user equipment to establish a connection with a first network and a second network:
        establishing a connection to each of the first network and the second network;
        tuning away from the first network to the second network, wherein the tuning away causes a loss of synchronization with the first network;
        tuning back to the first network from the second network;
        after tuning back to the first network and prior to a subsequent tuning away from the first network to the second network, determining whether to perform a network operation to reestablish synchronization with the first network based on whether a predetermined condition is met, wherein the determining whether the predetermined condition is met includes determining an amount of data in an uplink buffer of the user equipment; and
        performing the network operation to reestablish synchronization with the first network during a time duration between the tuning back to the first network and the subsequent tuning away from the first network to the second network only when the predetermined condition is met, wherein the UE does not attempt to reestablish synchronization with the first network during the time duration when the predetermined condition is not met.

2. The method of claim 1, wherein the network operation includes one of transmitting a scheduling request to the first network or initiating a random access channel (RACH) procedure with the first network.

3. The method of claim 1, wherein the user equipment omits performing the network operation after tuning back to the first network.

4. The method of claim 1, wherein the network operation is performed when the amount of data in the uplink buffer is greater than a threshold.

5. The method of claim 4, wherein the threshold is based on one of an amount of data required to maintain the connection to the first network, an identification of the first network, a type of the user equipment, a level of service for the user equipment or a connection quality parameter of the connection to the first network.

6. The method of claim 1, wherein the determining whether the predetermined condition is met further includes:
    determining a duration between the tuning away and the tuning back.

7. The method of claim 6, wherein the network operation is performed when the duration exceeds a threshold, and wherein the threshold is based on the amount of data in the buffer.

8. The method of claim 1, wherein the determining whether the predetermined condition is met further includes:
    estimating a duration of an inactivity timer of the first network; and
    performing the network operation when the tuning away from the first network occurs within a time threshold of an estimated expiration of the inactivity timer.

9. The method of claim 8, wherein the inactivity timer is a radio resource control (RRC) timer of the first network.

10. The method of claim 8, wherein the estimating the duration of the inactivity timer includes one of:
    determining an action was performed by the first network for the user equipment based on the inactivity timer; or
    determining an action was performed by the first network for other user equipment connected to the first network based on the inactivity timer.

11. The method of claim 1, wherein the first network is an LTE network and the second network is a CDMA network.

12. A user equipment, comprising:
    an uplink buffer;

a transceiver configured to enable the user equipment to establish a connection with a first network and a second network; and a processor configured to:
  instruct the transceiver to establish a connection to each of the first network and the second network;
  instruct the transceiver to tune away from the first network to the second network,
    wherein the tuning away causes a loss of synchronization with the first network;
  instruct the transceiver to tune back to the first network from the second network;
  after tuning back to the first network and prior to a subsequent tuning away from the first network to the second network, determine whether to perform a network operation to reestablish synchronization with the first network based on whether a predetermined condition is met, wherein the determining whether the predetermined condition is met includes the processor determining an amount of data in the uplink buffer; and
  perform the network operation to reestablish synchronization with the first network during a time duration between the tuning back to the first network and the subsequent tuning away from the first network to the second network only when the predetermined condition is met, wherein the UE does not attempt to reestablish synchronization with the first network during the time duration when the predetermined condition is not met.

13. The user equipment of claim 12, wherein the network operation includes one of transmitting a scheduling request to the first network or initiating a random access channel (RACH) procedure with the first network.

14. The user equipment of claim 12, wherein the processor determines whether the predetermined condition is met by further determining a duration between the tuning away and the tuning back.

15. The user equipment of claim 12, wherein the processor determines whether the predetermined condition is met further by:
  estimating a duration of an inactivity timer of the first network; and
  performing the network operation when the tuning away from the first network occurs within a time threshold of an estimated expiration of the inactivity timer.

16. The user equipment of claim 15, further comprising:
  a timer, wherein the timer measures a time since a last uplink transmission by the user equipment, the time being compared to the time threshold.

17. The user equipment of claim 15, further comprising:
  a memory storing one of:
    an action performed by the first network for the user equipment based on the inactivity timer; or
    an action performed by the first network for other user equipment connected to the first network based on the inactivity timer.

18. A non-transitory computer-readable medium comprising a set of instructions that, when executed, cause a processor to perform operations, comprising:
  establishing a connection by a user equipment to each of a first network and a second network;
  tuning away the user equipment from the first network to the second network,
    wherein the tuning away causes a loss of synchronization with the first network;
  tuning back the user equipment to the first network from the second network;
  after tuning back to the first network and prior to a subsequent tuning away from the first network to the second network, determining whether to perform a network operation to reestablish synchronization with the first network based on whether a predetermined condition is met, wherein the determining whether the predetermined condition is met includes determining an amount of data in an uplink buffer of the user equipment; and
  performing the network operation to reestablish synchronization with the first network during a time duration between the tuning back to the first network and the subsequent tuning away from the first network to the second network only when the predetermined condition is met, wherein the UE does not attempt to reestablish synchronization with the first network during the time duration when the predetermined condition is not met and wherein the network operation includes to reestablish synchronization with the first network includes one of transmitting a scheduling request to the first network.

* * * * *

UNITED STATES PATENT AND TRADEMARK OFFICE
CERTIFICATE OF CORRECTION

PATENT NO. : 10,863,428 B2
APPLICATION NO. : 14/869325
DATED : December 8, 2020
INVENTOR(S) : Bhattacharjee et al.

Page 1 of 1

It is certified that error appears in the above-identified patent and that said Letters Patent is hereby corrected as shown below:

In the Claims

Claim 18, Column 14, Lines 41-44:
"and wherein the network operation includes to reestablish synchronization with the first network includes one of transmitting a scheduling request to the first network." should read "and wherein the network operation includes to reestablish synchronization with the first network includes transmitting a scheduling request to the first network."

Signed and Sealed this
Second Day of March, 2021

Drew Hirshfeld
*Performing the Functions and Duties of the
Under Secretary of Commerce for Intellectual Property and
Director of the United States Patent and Trademark Office*